United States Patent [19]

Pratt et al.

[11] Patent Number: 4,937,317
[45] Date of Patent: Jun. 26, 1990

[54] PROCESSABLE POLYIMIDE ADHESIVE AND MATRIX COMPOSITE RESIN

[75] Inventors: J. Richard Pratt; Terry L. St. Clair, both of Poquoson; Donald J. Progar, Grafton, all of Va.

[73] Assignee: The United States of America as represented by the Administrator of the National Aeronautics and Space Administration, Washington, D.C.

[21] Appl. No.: 266,045

[22] Filed: Nov. 2, 1988

[51] Int. Cl.$^5$ .............................. C08G 69/26
[52] U.S. Cl. .................... 528/353; 528/125; 528/126; 528/172; 528/173; 528/176
[58] Field of Search ............... 528/353, 176, 125, 126, 528/172, 173

[56] References Cited

U.S. PATENT DOCUMENTS 4,820,791  4/1989  Hergenrother .................... 528/125

OTHER PUBLICATIONS

CA109(12): 93968d 4,4'-Isophthaloydiphthalic anhydride polyimides.

Primary Examiner—John Kight, III
Assistant Examiner—M. L. Moore
Attorney, Agent, or Firm—George F. Helfrich; John R. Manning; Charles E. B. Glenn

[57] ABSTRACT

A high temperature polyimide composition prepared by reacting 4,4'-isophthaloyldiphthalic anhydride with metaphenylenediamine is employed to prepare matrix resins, adhesives, films, coatings, moldings, and laminates.

18 Claims, No Drawings

PROCESSABLE POLYIMIDE ADHESIVE AND MATRIX COMPOSITE RESIN

ORIGIN OF THE INVENTION

The invention described herein was jointly made by employees of the United States Government and in the performance of work under a NASA contract and is subject to the provisions of Section 305 of the National Aeronautics and Space Act of 1958, as amended, Public Law 85–568 (72 Stat. 435; 42 USC 2457).

BACKGROUND OF THE INVENTION

1. Field of the Invention

This invention relates to the preparation of adhesives, matrix resins for composites, molding powders, films, and laminates, especially those showing enhanced flow with retention of mechanical and adhesive properties.

2. Description of the Related Art

High performance polyimide adhesives are used in the aerospace industry, for example, in joining metals to metals or metals to composite structures. In addition they are rapidly finding new uses as matrix resins for composites, molding powders, and films. These materials display a number of performance characteristics such as high temperature and solvent resistance, improved flow for better wetting and bonding, solvent resistance, high modulus, chemical and hot water resistance, etc. One area of application is in the manufacture of lighter and stronger aircraft and spacecraft structures.

LaRC-TPI is a thermoplastic polyimide well known as a high performance material (V. L. Bell, B. L. Stump, and H. Gager, *J. Polym. Sci., Poly. Chem.*, Ed. 14, 2275 (1976); D. J. Progar, V. L. Bell, and T. L. St. Clair, NASA Research Center, "Polyimide Adhesives," U.S. Pat. No. 4,065,345 (1977); V. L. Bell, NASA Langley Research Center, "Process for Preparing Thermoplastic Aromatic Polyimides," U.S. Pat. No. 4,094,862 (1978); A. K. St. Clair and T. L. St. Clair, NASA Langley Research Center, "High Temperature Polyimide Film Laminates and Process for Preparation Thereof," U.S. Pat. No. 4,543,295 (1985); A. K. St. Clair and T. L. St. Clair, "A Multi-Purpose Thermoplastic Polyimide," *SAMPE Quarterly*, Oct. 1981, pp. 20–25).

Its structure, as shown below,

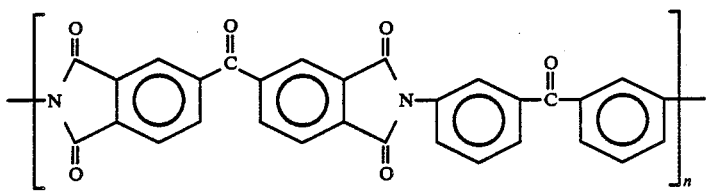

LARC TPI is derived from 3,3′,4,4′-benzophenonetetracarboxylic dianhydride (BTDA) and 3,3′-diaminobenzophenone (3,3′-DABP) and is prepared in 2-methoxyethyl ether (diglyme). It was invented at NASA Langley Research Center and is a commercially available product sold by Mitsui Toatsu (Mitsui Toatsu Chemicals, Inc., New York) and the Rogers Corporation (D.C. Sherman, C. Y. Chen, and J. L. Cercena, *SAMPE Preprints*, 33, 134 (1988)) as a molding powder, poly(amic acid) solution, and film.

The commercialization of the 3,3′-DABP component of LaRC-TPI has not occurred in the United States because it has been shown to be a mutagen. (W. D. Ross, J. E. Nobel, J. A. Gridley, J. M. FullenKamp, M. T. Winiger, and J. A. Graham, "Mutagenic Screening of Diamine Monomers", NASA Contractor Report 166085, Monsanto Research Corporation, February 1983.) Hence, only experimental samples of this chemical can be purchased for research purposes. One U.S. company prepares and polymerizes the 3,3′-DABP in situ, limiting the exposure of workers to this diamine. However, this process is costly.

In addition, the original version of LaRC-TPI (solution of poly(amic acid) in diglyme) appears to have an undesirably large and(or) broad molecular weight distribution, containing amine and anhydride functional end groups such that the initial imidized powders do not mold well and exhibit poor melt stability.

We have discovered a way of producing high molecular weight 4,4′-isophthaloyldiphthalic anhydride-metaphenylenediamine (IDPA-m-PDA) polyimides (henceforth referred to as LaRC-I-TPI) that have controlled molecular weight through end-capping. These materials are readily processed in their fully imidized form to afford well-consolidated composites, high quality moldings, high strength adhesive bonds, and tough flexible films and coatings.

SUMMARY OF THE INVENTION

An object of this invention is a novel polymer in an endcapped and unendcapped form which exhibits melt flow and adhesive properties that make it attractive as a matrix resin for composites, a molding powder, an adhesive, a polymer film, and as a film for coatings.

Another object of this invention is to provide a process for preparing and using aromatic polyimides which reasonably process to make fiber-reinforced composites composed of an organic resin and a reinforcing fiber.

Another object of this invention is to provide a process for preparing and using aromatic polyimides as adhesives that can be reasonably processed to give materials with high bonding strengths and thermooxidative stability.

Another object of this invention is to provide a process for preparing well-consolidated polyimide moldings by heating imidized powders at high temperatures and pressures.

Another object of this invention is to provide a process for preparing thin films and coatings by heating a poly(amic acid) solution on a substrate.

The need for new and less expensive polyimide monomers of low toxicity for preparing high performance materials has been satisfied in the combination of 4,4′-isophthaloyldiphthalic anhydride (IDPA) and meta-phenylenediamine (m-PDA), which is designated LaRC-I-TPI and is shown below.

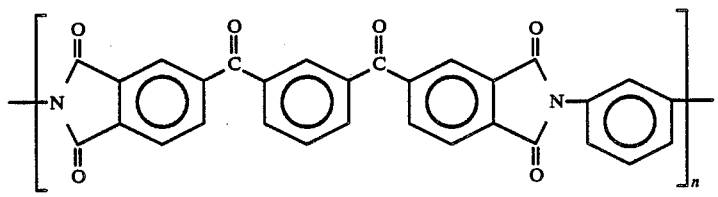

LARC—I—TPI

This new composition is based on a low toxicity, non-mutagenic, commodity diamine (metaphenylenediamine); the polyimide is an isomer of the commercially available LaRC-TPI, both being $C_{30}H_{14}N_2O_6$ polyimides. The IDPA monomer is readily synthesized by standard techniques and is inexpensive. Because of similarities in the structures of LaRC-TPI and LaRC-I-TPI, one might expect them to have similar properties. Thus, one can obtain LaRC-TPI-like properties while avoiding the pitfalls of working with 3,3'-DABP, a suspect carcinogen.

This composition has been realized in LaRC-I-TPI (isomeric TPI), a material found to behave similarly to LaRC-TPI in certain properties such as Tg, film forming ability, solubility, and isothermal thermogravimetric analysis weight loss. Of special importance is the fact that by preparing isomeric TPI with suitable endcaps, we have generated adhesives, composite matrix resins, neat resin moldings and films or coatings having identical or superior properties to the commercially available LaRC-TPI. For example, end-capped LaRC-I-TPI displays excellent moldability and adhesive properties. Because of its insolubility in diglyme, unlike LaRC-TPI, LaRC-I-TPI has been manufactured in N,N-dimethylacetamide (DMAc) or DMAc-diglyme mixtures.

LaRC-I-TPI has been used to prepare graphite-reinforced composites using both the endcapped and unendcapped versions; however, superior melt flow was noted for the endcapped version. This higher level of melt flow is important in making large, complex-shaped composites. The composites were consolidated from graphite fiber that had been coated with LaRC-I-TPI from a solution of DMAc. After drying at 175° C. the consolidation was accomplished at 350° C. under 300 psi pressure.

Description of the Preferred Embodiments

The invention and its advantages are illustrated completely by the specific examples given below. Lap shear tensile strength measurements were conducted according to ASTM.D-1002 (CTM No. 26). Titanium lap shear specimens were fabricated from four-finger panels. Each finger test joint specimen was 2.54 cm (one inch wide) and the bonded overlap was 1.27 cm (0.5 inch). The titanium finger panels were fabricated from 6-aluminum 4-vanadium titanium alloy, nominally 0.127 cm (0.050 inch) thick. The metal panels were given a Pasa Jell surface treatment prior to priming and bonding.

EXAMPLES

EXAMPLE 1

IDPA-m-PDA Offset Stoichiometry with 4-Fluorophthalic Anhydride End-Cap

Metaphenylenediamine (0.1000 g, $9.247 \times 10^{-4}$ mole) was dissolved in 1.9456 g DMAc. 4-Fluorophthalic anhydride (0.0061 g), 4 mol % end-cap, was added to the solution contained in a flamed out vaccine bottle with magnetic stirrer and stirred at room temperature for one-half hour. 4,4'-Isophthaloyldiphthalic anhydride, IDPA (0.3864 g, $0.062 \times 10^{-4}$ mole, 98% of stoichiometry) was added to make the solution 20% solids, and this solution was covered with a rubber septum and stirred overnight. The resulting solution had an inherent viscosity of 0.32 dl/g measured at 0.5% (wt./vol.) solids and 35° C. in DMAc. A 20 mil wet thickness film was cast on glass, air dried in a low humidity chamber, and cured in air for one hour each at 100° C., 200° C., and 300° C. The resulting film was creasable, insoluble in refluxing DMAc, methylene chloride, and m-cresol, and appeared amorphous by DSC, having a Tg of 252° C.

EXAMPLE 2

Offset Stoichiometry with Aniline End-cap, Reverse addition, IDPA and m-PDA

To a solution of 0.0026 g aniline (4.0 mol %) end-cap in 1.4972 g DMAC (to make a final solution 20% solids) was added 0.3000 g ($7.036 \times 10^{-4}$ mol) of IDPA. After stirring in a stopper vaccine bottle for one-half hour, 0.0754 g ($6.895 \times 10^{-4}$ mol) m-PDA, 98% of stoichiometry, was added, and the solution was stirred at 25° C. overnight. The viscosity of the resulting poly(amic acid) was 0.23 dl/g at 35° C. in DMAc at a concentration of 0.5% (wt./vol.). A 20 mil (wet thickness) coating was cast on glass, dried and cured for one hour each at 100° C., 200° C., and 300° C. on glass in air. The coating was removed to afford a film that was insoluble in refluxing DMAc, methylene chloride, and m-cresol. This film was creasable, had a Tg of 253° C. (DSC), and appeared amorphous by DSC.

EXAMPLE 3

IDPA-m-PDA, Offset Stoichiometry, 5 mol % IDPA Replaced with 10 mol % 4-Fluorophthalic Anhydride End-Cap To a solution of 0.0761 g ($7.04 \times 10^{-4}$ mol) of m-PDA in 1.4912 g DMAc in a serum bottle was added 0.0117 g ($7.04 \times 10^{-5}$ mol) of 4-fluorophthalic anhydride. After stirring this solution of one-half hour, IDPA (0.2859 g, $6.6846 \times 10^{-4}$ mol) was added, and this solution was allowed to stir at 25° C. overnight. The inherent viscosity of the poly(amic acid) in DMAc at 35° C. was 0.28 dl/g, and a 20 mil wet film, when cured to 300° C., snapped on attempted creasing. Its Tg by DSC was 246° C. and showed no evidence of crystallinity.

EXAMPLE 4

IDPA-m-PDA, Offset Stoichiometry, 10 mol % Anisidine

A solution of m-PDA (0.0723 g, $6.68 \times 10^{-4}$ mol, 95 mol % theoretical) and anisidine (0.0087 g, $7.064 \times 10^{-5}$ mol, 10 mol %) end-cap was prepared in 1.5240 g of DMAc in a dried and stoppered vaccine bottle to give a final solution of 20% solids. The IDPA (0.3000 g, $7.036 \times 10^{-4}$ mol, 100 mol % theoretical) was then added, and the mixture was allowed to stir at 25° C. overnight with a magnetic stirrer. The inherent viscosity was 0.32 dl/g at 35° C. in DMAc. A 20 mil wet film was cast onto glass, air dried, and cured to 300° C. in air. Brittle pieces of film resulted, showing no crystallinity and having a Tg of 246° C. (DSC).

EXAMPLE 5

IDPA-m-PDA, Balanced Stoichiometry, No End-Cap

A solution of m-PDA (2.029 g, 0.01876 mol) in 40.12 g DMAc was prepared in a small screw-cap, dried glass bottle. IDPA (8.000 g, 0.01876 mol) was added in one charge, and the mixture was allowed to stir with a magnetic stirred overnight at 25° C. The final poly(amic acid) solution had a concentration of 20% solids. The inherent viscosity was 0 52 dl/g, run at 35° C. in DMAc at a concentration of 0.5% (wt/vol.). The solution was stored in the refrigerator until needed.

EXAMPLE 6

Balanced Stoichiometry, 4 Mol% Aniline End-Cap

A solution of 0.5148 g DMAc and 0.0761 g m-PDA was prepared. IDPA (0.3000 g, $7.04 \times 10^{-4}$ mol) was added and stirred at 25° C. for one-half hour. The aniline end-cap (0.0026 g, 4.0 mol %) was then added and stirred overnight. The inherent viscosity of the resulting solution was 0.40 dl/g at 35° C. in DMAc. A 20 mil wet thickness film was dried and cured to 300° C. in air. The resulting gold-colored film was creasable and insoluble in refluxing DMAc, methylene chloride, and m-cresol. The DSC revealed no crystallinity and a Tg of 253° C.

EXAMPLE 7

Balanced Stoichiometry, 4 mol %, 4-Fluorophthalic Anhydride End-Cap

A solution of 1.5228 g DMAc and 0.0761 g m-PDA was prepared. IDPA (0.3000 g) was added and stirred one-half hour at 25° C. The end-cap, 4-fluorophthalic anhydride (0.0046 g, 4 mol %) was then added and the solution stirred at 25° C. overnight to make the solution 20% solids. The inherent viscosity of the poly(amic acid) solution was 0.39 dl/g at 35° C. in DMAc. A film (20 mil wet thickness) cast on soda-lime glass was dried in a low humidity chamber and cured for one hour each at 100° C., 200° C., and 300° C. The film was gold-colored and snapped on attempted creasing. It was insoluble at the 1% level in refluxing DMAc, methylene chloride, and m-cresol and had a Tg of 247° C. (DSC). No crystallinity was observed by DSC.

EXAMPLE 8

IDPA-m-PDA, Balanced Stoichiometry, 4 mol % Phthalic Anhydride End-Cap

A solution of 2-methoxyethyl ether (diglyme), 39.00 g and DMAc, 111.4 g was mixed with m-PDA (7.6093 g, 0.070362 mol). Phthalic anhydride (0.4169 g, 4 mol %) was added and allowed to stir for one-half hour at 25° C. The IDPA (30.000 g, 0.070365 mol) was added and a large exotherm was observed. After three hours the 20% solution was refrigerated. The inherent viscosity was 0.43 dl/g at 35° C. in DMAc. This poly(amic acid) solution was stored at 0° C. until ready for adhesive bonding.

EXAMPLE 9

IDPA-m-PDA, Balanced Stoichiometry, 2.75 mol % Phthalic Anhydride End-Cap

The procedure of Example 8 was repeated except that 0.2866 g (2.75 mol %) of phthalic anhydride was used as the end-cap. After stirring at 25° C. overnight the viscosity of the poly(amic acid) solution was determined to be 0.51 dl/g at 35° C. in DMAc. The solution was stored at 0° C. until used.

EXAMPLE 10

Preparation of Graphite Polyimide Prepreg

The composition according to Example 5 dissolved in N,N-dimethylacetamide, was coated on unidirectional graphite fiber at approximately 30% by volume (resin solids to fiber) to form a preimpregnated graphite fiber (prepreg). This prepreg was air dried at ambient conditions until it was tack-free and then dried in a forced air oven at 191° C. for one and one-half hours.

EXAMPLE 11

Preparation of Graphite Polyimide Prepreg

The composition according to Example 8 was dissolved in DMAc and was used to prepare prepreg according to Example 10.

EXAMPLE 12

Preparation of Composites

The prepregs from Examples 10 and 11 were placed in separate matched metal molds and each was heated to 204° C. where 300 psi pressure was applied. They were further heated to 350° C. and held under pressure at that final temperature for one hour. The molds were cooled under pressure to ambient temperature and the pressure was released. Well-consolidated composites resulted in both cases with the end-capped composition exhibiting the higher degree of flow.

EXAMPLE 13

A solution of the composition of Example 5, i.e., IDPA-m-PDA, 20 wt. % solids in DMAc, was used to prepare an adhesive tape as follows. The above solution was diluted to 7.5 wt. % solids in DMAc and applied to style 112, A1100 finish E-glass cloth which had been dried for one-half hour at 100° C. in a forced-air oven. Said coated cloth was air-dried for one hour at room temperature and heated for one-half hour at each of these temperatures: 100° C., 150° C., and 175° C. Subsequently, applications of a 20 wt. % solids solution were applied onto the cloth and heated as follows after each application until a thickness of approximately 0.03 cm was obtained: (1) room temperature (RT), held approximately 15 minutes; heated in a force-air oven for 15 minutes at approximately 50° C.; (2) RT→100° C., held one-half hour; (3) 100° C.→150° C., held one-half hour; (4) 150° C.→175° C., held one-half hour. The area to be bonded was coated (primed) on each adherend with the 20 wt. % solids solution of IDPA-m-PDA and air dried for one-half hour; it was heated 15 minutes at 100° C. and 15 minutes at 150° C. prior to bonding with the adhesive tape.

The above prepared adhesive tape was cut into strips sufficient to cover the bond area so as to give a 1.27 cm overlap for the previously prepared (Pasa Jell 107) titanium alloy (Ti-6Al-4V) four-fingered panel adherends. The tape was placed between the overlapped panels and the specimens were assembled in a bonding jig in such a manner as to hold the specimens securely while being bonded. The assembly was placed in a hydraulic press and 2.07 MPa (300 psi) pressure was applied. The temperature, which was monitored by a thermocouple spotwelded next to the bondline of one of the specimens, was increased from RT to 343° C. over a period of approximately 40 minutes. The temperature of the specimen was held at 343° C. for one hour, while pressure was maintained at 2.07 MPa (300 psi). The heat was turned off and the press allowed to cool, under pressure, to less than 150° C. At that time the bonded panel was removed from the press and the bonding jig, the individual lap shear specimens were separated with a metal shearer, and the lap shear strengths were determined according to the procedure for ASTM.D-1002. Four specimens tested gave an average of 18.5 MPa (2680 psi) at RT, 22.9 MPa (3320 psi) at 204° C., and 20.8 MPa (3030 psi) at 232° C. Failures were primarily cohesive.

EXAMPLE 14

Adhesive Tape Preparation and Bonding

A solution of the composition of Example 8, i.e., IDPA-m-PDA, 4 mol % PA, 20 wt. % solids in diglyme/DMAc, was used to prepare an adhesive tape and bond Ti-6Al-4V adherends in the same manner as in Example 13. At least four lap shear specimens were tested at each test temperature: RT, 204° C., and 232° C. Average lap shear strengths were: RT, 29.4 MPa (4260 psi); 204° C., 24.5 MPa (3560 psi); and 232° C., 18.0 MPa (2610 psi). Failures were primarily cohesive.

EXAMPLE 15

Adhesive Tape Preparation and Bonding

A solution of the composition of Example 9, i.e., IDPA-m-PDA, 2.75 mol % phthalic anhydride, 20 wt. % solids in diglyme/DMAc, was used to prepare adhesive tape and bond Ti-6Al-4V adherends in the same manner as in Example 13. Average lap shear strengths for four tested specimens at each test temperature were: RT, 25.0 MPa (3620 psi); 204° C., 24.3 MPa (3520 psi); and 232° C., 12.0 MPa (1740 psi). Failures were cohesive at 204° C. and a combination of cohesive/adhesive at RT and 232° C.

EXAMPLE 16

Preparation of Neat Resin Moldings from IDPA-m-PDA (Unendcapped) and 2.75 mol % Phthalic Anhydride Endcapped Polyimides The poly(amic acid) solutions from Examples 5 and 9 (unendcapped and 2.75 mol % phthalic anhydride encapped, respectively) were separately precipitated in a blender from deionized water. The powders that resulted were washed twice each in a blender with water and air-dried overnight under the hood. They were imidized for one hour each at 100° C., ° C., and 300° C. One gram of each powder was introduced in a circular mold which had been pretreated with Frekote 33 releasing agent at 100° C. The laboratory press was preheated to 300° C. and the mold containing the polyimide was added and pressured to 500 psi for one minute. The pressure was released to allow any volatiles to escape until the temperature of the mold had reached 300° C. (±5° C.). The mold was pressurized to 500 psi and held at temperature for one hour. It was then cooled under pressure with an air stream to 100° C., and the pressure was released. The resulting one-inch square moldings were well-consolidated, transparent and dark brown in color.

The present invention has been described in detail with respect to certain preferred embodiments thereof. However, as understood by those of skill in the art, variations and modifications in this detail may be made without any departure from the spirit and scope of the present invention as defined in the hereto-appended claims.

What is claimed is:

1. A high temperature polyimide composition prepared by reacting 4,4'-isophthaloyldiphthalic anhydride and metaphenylenediamine.

2. The composition of claim 1 which has been endcapped with a monofunctional aromatic amine or a monofunctional aromatic anhydride at a concentration of up to about 10 mol percent and having balanced stoichiometric amounts of 4,4'-isophthaloyldiphthalic anhydride and metaphenylenediamine.

3. The composition of claim 1 which has been endcapped with up to about 10 mol percent of a monofunctional aromatic amine or a monofunctional aromatic anhydride and having unbalanced stoichiometry such that a molar deficit in the 4,4'-isophthaloyldiphthalic anhydride monomer is compensated with twice the molar amount of monofunctional aromatic anhydride, and a molar deficit in the metaphenylenediamine monomer is compensated with twice the molar amount of monofuctional aromatic amine.

4. The composition of claim 1 mixed with graphite fiber and processed to form a well consolidated composite.

5. The composition of claim 2 mixed with graphite fiber and processed to form a well consolidated composite.

6. The composition of claim 1 prepared in a solvent selected from the group consisting of N,N-dimethylacetamide and 2-methoxyethyl ether in a weight ratio of about 3:1.

7. The composition of claim 2 prepared in a solvent selected from the group consisting of N,N-dimethylacetamide and 2-methoxyethyl ether in a weight ratio of about 3:1.

8. The composition of claim 3 prepared in a solvent selected from the group consisting of N,N-dimethylacetamide and 2-methoxyethyl ether in a weight ratio of about 3:1.

9. A translucent molded material prepared by molding an imidized powder of the composition of claim 1.

10. A translucent molded material prepared by molding an imidized powder of the composition of claim 2.

11. A translucent molded material prepared by molding an imidized powder of the composition of claim 3.

12. A high temperature defect-free coating formed by coating a poly(amic acid) solution of the composition of claim 1 upon a substrate and thermally imidizing the coating.

13. A high temperature defect-free coating formed by coating a poly(amic acid) solution of the composition of claim 2 upon a substrate and thermally imidizing the coating.

14. A high temperature defect-free coating formed by coating a poly(amic acid) solution of the composition of claim 3 upon a substrate and thermally imidizing the coating.

15. A creasable, transparent, high temperature film formed by casting a poly(amic acid) solution of the composition of claim 1 upon a substrate, drying the cast solution to form a film, thermally imidizing the film, and removing the thermally imidized film from a substrate.

16. A creasable, transparent, high temperature film formed by casting a poly(amic acid) solution of the composition of claim 2 upon a substrate, drying the cast solution to form a film, thermally imidizing the film, and removing the thermally imidized film from a substrate.

17. A creasable, transparent, high temperature film formed by casting a poly(amic acid) solution of the composition of claim 3 upon a substrate, drying the cast solution to form a film, thermally imidizing the film, and removing the thermally imidized film from a substrate.

18. An adhesive prepared from metaphenylenediamine reacted with 4,4'-isophthaloyldiphthalic anhydride.

* * * * *